United States Patent [19]

Frost

[11] Patent Number: 5,030,182

[45] Date of Patent: Jul. 9, 1991

[54] FULL TIME POWER TRANSFER CASE

[75] Inventor: Barry L. Frost, DeWitt, N.Y.

[73] Assignee: New Venture Gear, Inc., Troy, Mich.

[21] Appl. No.: 479,881

[22] Filed: Feb. 14, 1990

[51] Int. Cl.$^5$ .............................................. F16H 37/08
[52] U.S. Cl. ....................................... 475/204; 475/86
[58] Field of Search .................. 475/84, 86, 89, 204, 475/206, 249; 180/247–250

[56] References Cited

U.S. PATENT DOCUMENTS

| | | | |
|---|---|---|---|
| 4,422,349 | 12/1983 | Matsumoto et al. | 475/204 X |
| 4,458,557 | 7/1984 | Hayakawa | 475/204 X |
| 4,538,700 | 9/1985 | Suzuki | 480/250 X |
| 4,644,822 | 2/1987 | Batchelor | 475/204 |
| 4,677,873 | 7/1987 | Eastman et al. | 475/204 |
| 4,690,015 | 9/1987 | Nagano et al. | 475/295 |
| 4,711,136 | 12/1987 | Yoshinaku et al. | 475/295 |
| 4,804,061 | 2/1989 | Kameda | 180/250 X |
| 4,805,485 | 2/1989 | Ida | 180/250 X |
| 4,878,399 | 11/1989 | Kameda | 180/250 X |
| 4,898,259 | 2/1990 | Fujitani et al. | 180/250 |

FOREIGN PATENT DOCUMENTS 56-14649   2/1981   Japan ..................... 475/204

*Primary Examiner*—Dwight Diehl
*Attorney, Agent, or Firm*—Harness, Dickey & Pierce

[57] ABSTRACT

An automatic power shift transfer case for a four wheel drive vehicle has a front high-low range planetary gear set and a rear differential planetary gear set aligned symmetrically about the transfer case central shaft axis. The front and rear planetary gear sets are arranged in a back-to-back substantially mirror image manner so as to share a common carrier interposed therebetween. The front planetary gear set with either its low or high range clutch applied selectively delivers a corresponding speed through the common carrier to the rear planetary gear set. The torque flow is split in a predetermined manner wherein a minimum torque to maximum may be selectively delivered to the rear axle, via a rear planetary gear set modulating clutch while the remaining torque is normally delivered to the front axle. Lock-up of the modulating clutch allows the front axle to be disconnected providing a two-wheel drive mode.

8 Claims, 4 Drawing Sheets

FULL TIME POWER TRANSFER CASE

BACKGROUND OF THE INVENTION

This invention relates generally to vehicle transfer cases having a plurality of outputs and more particularly to an automatic power transfer case providing full time four wheel drive.

It is known to provide vehicle transfer cases having full time four wheel drive capabilities which utilize manual shifting. An example of such a transfer case is found in U.S. Pat. No. 4,677,873 issued Jul. 7, 1987 to R.E. Eastman et al. entitled Transfer Case With Inter-Axle Dual-Planetary Differential.

The U.S. Pat. No. 3,845,671 issued Nov. 5, 1974 to E.A. Sharp et al. discloses a slip controlled four wheel drive train including a transfer case adapted to provide full time four wheel drive. A differential is provided in the transfer case which is electrically controlled to be locked to prevent differentiation when slip between the input and output shafts exceed a predetermined tolerance.

The U.S. Pat. No. 4,644,822 issued Feb. 24, 1987 to R.B. Batchelor discloses a transfer case for vehicle drivetrains having back-to-back first and second planetary gear sets.

The U.S. Pat. No. 4,690,015 issued Sept. 1, 1987 to Nagano et al. discloses a power transfer device for automotive vehicles.

The U.S. Pat. No. 4,711,136 issued Dec. 8, 1987 to Yoshinaka et al. discloses a power transfer device for four-wheel drive vehicles.

SUMMARY OF THE INVENTION

It is an object of the present invention to provide an automatic power transfer case for full time four wheel drive vehicles.

It is another object of the present invention to provide an automatic power transfer case for full time four wheel drive vehicles which allows range shifts from operator inputs.

It is still another object of the present invention to provide an automatic power transfer case as set forth above which modulates above shift using adaptive controls.

It is a further object of the present invention to provide an automatic transfer case as set forth above which limits down shifts below safe speeds.

It is still a further object of the present invention to provide an automatic transfer case as set forth above wherein the operator determines shifting of mode from switch means. Thus, in four wheel operation the operator may selectively shift from four wheel high range full time to two wheel high range or back. The transfer case in automatic four wheel drive allows automatic shifting from four wheel high range full time to two wheel drive high range at a set RPM in high only. (four wheel below and two wheel above). The automatic transfer case allows selection of differential lockup in either part-time or full-time four wheel operation. Further, automatic differential lock-up allows the operator to selectively shift into part-time four-wheel drive when the speed differential of the front wheels to the rear wheels exceeds a set RPM as determined by a tachometer operatively connected to the front drive shaft yoke. The automatic transfer case further prohibits selection of two-wheel drive low-range.

A primary feature of the automatic power shift transfer case of the present invention incorporates a front high-low range planetary gear set and a rear inter-axle differential planetary gear set aligned symmetrically about the axis of the transfer case central shaft. The front and rear planetary gear sets are arranged in a back-to-back substantially mirror image manner enabling the front and rear gear sets to share a common carrier interposed therebetween. A front quill shaft, formed with a sun gear of the front gear set, journally surrounds the central shaft and has its front end fixed to the coaxial input shaft. A rear quill sleeve is splined on the central shaft and is formed with a sun gear of the rear gear set such that the sun gears are disposed in adjacent mirror image relation.

The front planetary gear set utilizes both a high-range clutch and a low-range clutch which are applied selectively by the operator. Front return spring means act to oppose the extension of a front piston controlling both the high and low range clutch by normally resiliently applying the high-range clutches while normally releasing the low-range clutch. Thus, if the front piston is not hydraulically pressurized the engaged high range clutch causes a high speed ratio to be transmitted via the front planetary gear set to the common carrier and the rear quill sleeve to a first output. Pressurizing the front piston, however, de-activates the high-range clutch and applies the low-range clutch causing a low speed ratio to be transmitted via the front planetary gear set common carrier to the rear planetary gear set for subsequent torque splitting between the first output and a second output.

The rear inter-axle differential planetary gear set utilizes both a spring applied modulating lock-up clutch and a two-wheel/four-wheel drive mode spring released clutch adapted to be selectively released. Rear return spring means act to opposed the extension of an inner rear piston concentrically nested within an outer piston. Pressurization of the inner rear piston releases the differential lock-up clutch while pressurization of the outer rear piston releases the mode clutch. With the transfer case in its two-wheel high-range drive state a fail-safe condition is provided wherein only the rear inner piston is not pressurized causing the common carrier to be locked to the rear sun gear via the applied lock-up clutch thereby locking out the rear planetary differential gear set. Thus, high-range torque flow delivered to the common carrier is transferred directly to the rear quill sleeve and thence to the first output via the central shaft.

With the transfer case in its full-time four-wheel high-range drive state both the inner and outer rear pistons are pressurized releasing the lock-out clutch and applying the mode clutch. Here, high-range torque flow delivered to the common carrier is transmitted to the rear pinion gears whereby the torque is split in a predetermined manner between the rear sun gear for flow to the first output and the rear annulus gear for flow to the second output.

With the transfer case in its four-wheel drive low-range state (part-time) the front piston and the outer rear piston are pressurized whereby the low-range clutch, the lock-up clutch, and the mode clutch are all applied. Thus, upon low-range drive torque being transmitted to the common carrier and then through the applied clutches, the power flow is to the first output and/or to the second output depending on the ground load conditions.

The transfer case of the present invention lastly provides a variable ratio axle torque split state wherein the front central piston and the outer rear piston are pressurized while the inner rear piston may be partially engaged or feathered. Thus, in the disclosed embodiment the rear pinion gear set normally splits the torque flow such that about sixty percent is delivered to the vehicle front axle and about forty percent is delivered to the vehicle rear axle. By "feathering" the rear planetary gear set modulating lock-up clutch a torque flow to the rear axle may be varied from a minimum of forty percent to a maximum of one hundred percent with the lock-up clutch fully applied depending on the ground load conditions.

A feature of the invention is that a minimum torque is delivered to the vehicle rear axle via the sun gear of the rear planetary gear set while torques above the minimum can be transmitted directly to the rear axle. This is possible by partially engaging a modulating lock-up clutch, affixed to a portion of the common carrier associated with the rear planetary gear set. One hundred percent or full torque may be delivered to the rear axle as determined by the ground load conditions, upon full engagement of the modulating clutch.

The mode clutch is spring biased to provide two-wheel drive by normally acting to uncouple a rearward extension of the rear planetary annulus gear from a concentrically disposed piston cylinder shell affixed to the second which second journally supported for rotation about the central axis. The piston shell, together with a mode piston axially slidable therein, define a mode pressure chamber. Upon the mode piston being pressurized it applies the mode clutch thereby coupling the rear planetary annulus extension to the offset shaft which, in turn, drives the vehicle front axle.

These and other objects and advantages of the present invention will be readily apparent by reference to the following description of the preferred embodiment and appended drawings.

DETAILED DESCRIPTION OF THE INVENTION

Figure 1:
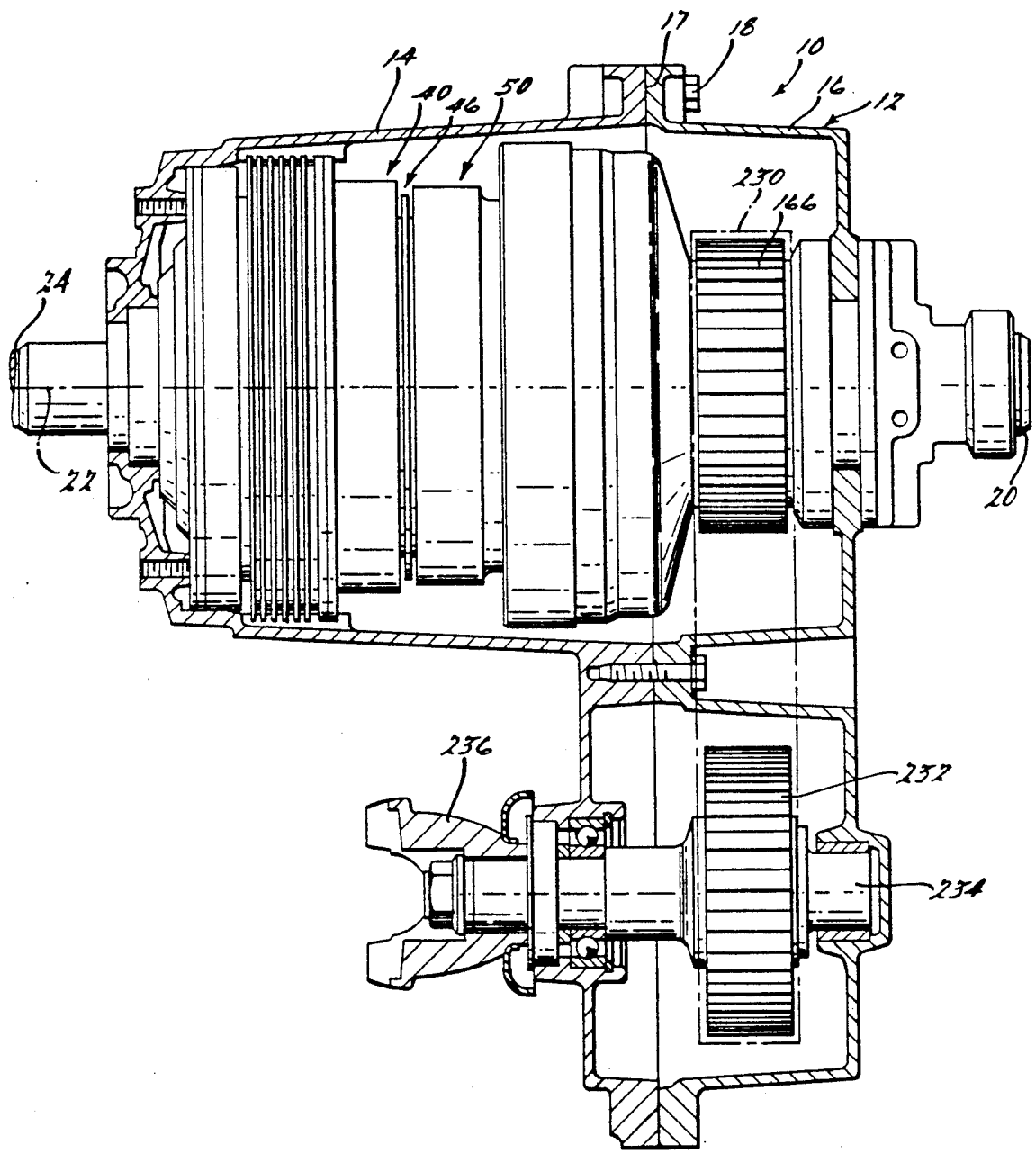
FIG. 1 is a longitudinal sectional view, partly in elevation, of an automatic power transfer case for a full time four-wheel drive vehicle, constructed in accordance with the present invention.
Figure 2:
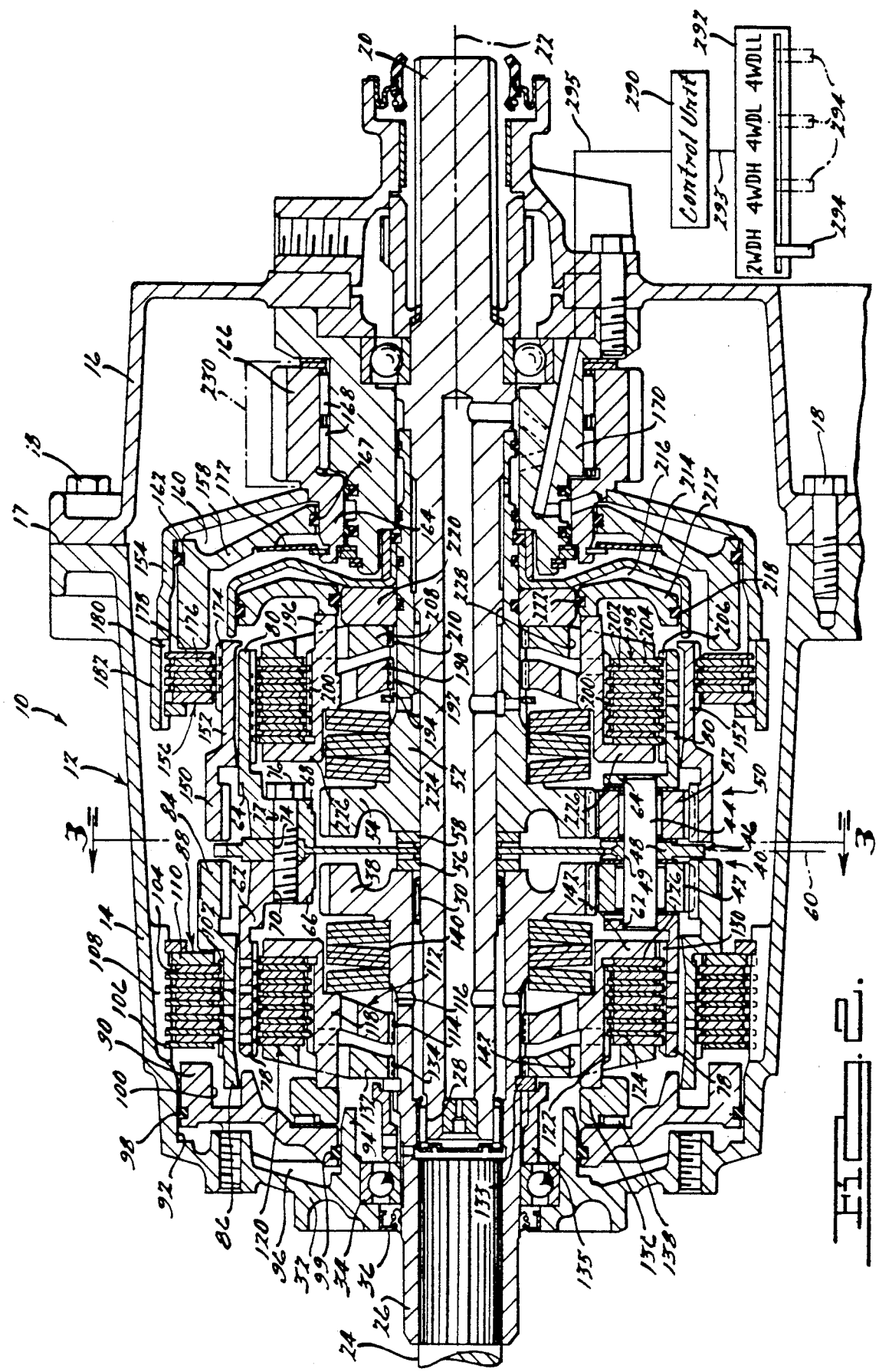
FIG. 2 is an enlarged fragmentary longitudinal sectional view of a portion of the transfer case of FIG. 1.
Figure 3:
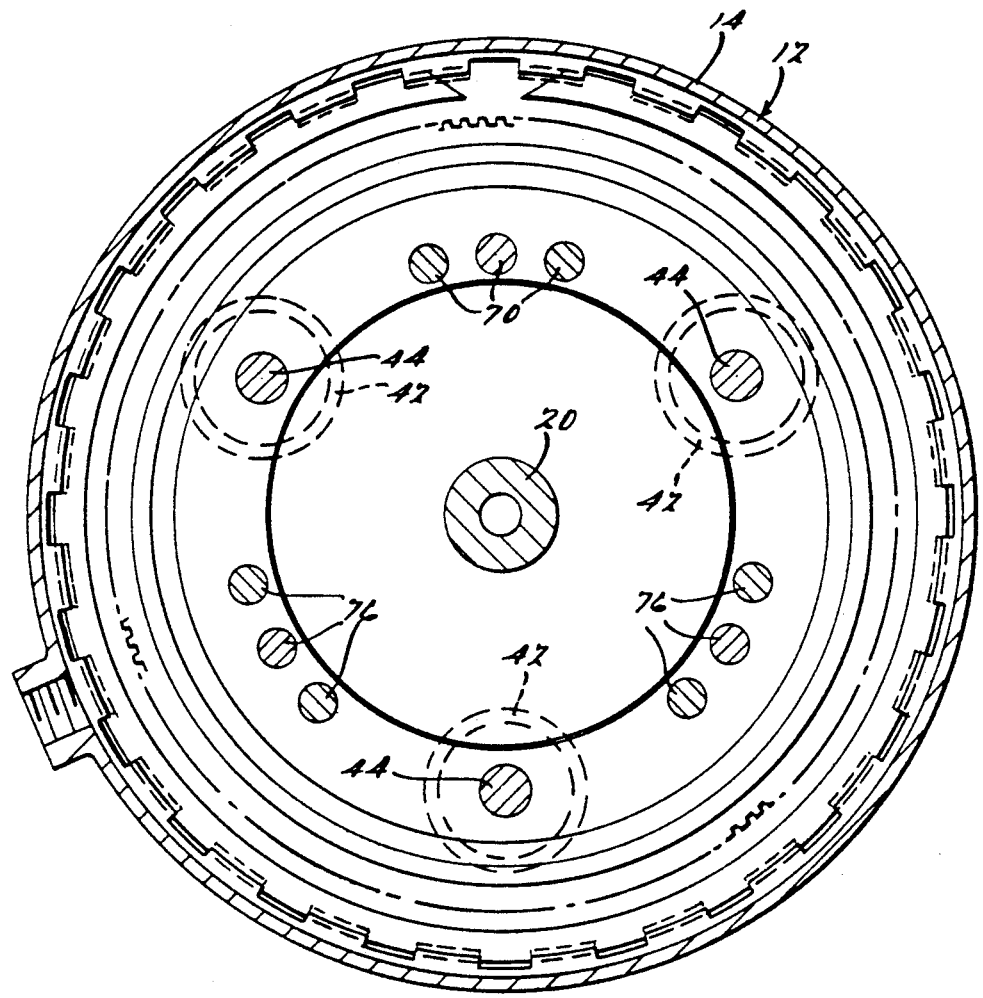
FIG. 3 is a vertical sectional view taken substantially on the line 3—3 of FIG. 2.

With reference now to the drawings, there is shown in FIG. 1 an automatic power transfer case 10 of the present invention including a housing assembly 12 comprising front 14 and back 16 half-sections suitably connected at a parting line 17 by a plurality of bolts 18. FIG. 2 shows a central or first output shaft 20 is aligned on the central axis 22 of the transfer case and its aft end projects rearwardly from the housing assembly and is adapted for connection to a vehicle rear wheel drive propeller shaft (not shown).

As seen in FIG. 2, the front half-section 14 of the housing assembly receives the aft end of a vehicle transmission output shaft 24 aligned on the central axis 22. A front quill sleeve 26 surrounds the forward end of the central shaft 20 and is journally supported thereon by bearings 28 and 30. The forward end of the front quill sleeve 26 projects from the housing assembly and is internally splined for telescopic engagement with external splines on the aft end of the transmission output shaft 24. The front quill sleeve 26 is rotatably mounted in hub portion 32 of the front half-section 14 by ball bearing assembly 34 and is sealingly enclosed by annular seal 36.

FIG. 2 shows the front quill sleeve having an input or first sun gear 38 integrally formed on its rearward end. The first sun gear 38, part of a front high-low range planetary helical gear set generally indicated at 40, is meshed with a first set of helical planet gears one of which is shown at 42. Each first planet gear 42 is rotatably jounalled on a longitudinally extending pin, such as pin 44 of a common carrier assembly, generally indicated at 46. The carrier assembly includes a center plate 48 concentrically supported about the central axis 22 having a plurality of apertures 49 through which the pins 44 are received. The carrier assembly 46 is common to both the first range planetary gear set 40 and a second or aft inter-axle differential planetary gear set generally indicated at 50.

With reference to FIG. 2 it will be seen that an aft quill sleeve 52 concentrically surrounds a portion of the center shaft 20 and is fixedly secured thereto for rotation therewith. The quill sleeve 52 has a second or aft sun gear 54 fixed on its forward end in opposed spaced relation with the first or forward sun gear 38. A pair of thrust bearings 56 and 58 are shown encircling the central shaft 20 intermediate the first 38 and second 58 sun gears so as to be disposed symmetrically on either side of a vertically extending transverse plane denoted by the dashed construction line 60.

The common carrier assembly 46 further comprises a pair of front 62 and rear 64 mirror image carrier rings symmetrically disposed on either side of the transverse plane of construction line 60. Each front and rear carrier ring is formed with a plurality of integral boss portions 66 and 68 respectively, having associated bores 70 and 72 aligned with holes 74 in the carrier center plate 48 for the threaded reception of a plurality of machine bolts 76. The front 62 carrier ring has an integral cylindrically shaped forwardly extending inner clutch drum 78 concentrically disposed about a portion of its associated front quill sleeve 26. The rear carrier ring 64 has an integral cylindrically shaped rearwardly extending inner clutch drum 80 concentrically disposed about a portion of its associated rear quill sleeve 52. It will be noted that the front 62 and rear 64 carrier rings are identical parts for interchangeable assembly.

Further, the pins 44 are symmetrically disposed with the transverse plane of symmetry denoted by the dashed line 60. The pins 44 have their ends supported in aligned holes in their adjacent front and rear carrier rings 62 and 64, respectively. Each pin 44 journally supports an associated rear pinion gear 82 of the second differential planetary gear set 50 which is in meshing relation with the second sun gear 54.

FIG. 2 shows a front annulus gear 84, concentrically disposed about the central axis 22, having its internal helical teeth meshing with the helical teeth of each first set pinion gear 42. The front annulus gear 84 has a cylindrically shaped integral forwardly extending outer clutch drum portion 86 concentrically surrounding the front carrier ring inner clutch drum portion 78. The outer clutch drum portion 86 supports with the outer housing front half-section 14 low range clutch means in the form of a low-range wet clutch pack generally indicated at 88.

An axially movable annular high/low range piston 90 is slidably received in a piston cup 92 formed in the housing front half-section 14 and defining with an inner annular housing flange 94 a range hydraulic pressure chamber 96. The range hydraulic pressure chamber 96 is sealed by range piston outer annular seal 98 and inner annular seal 99. An annular groove 100 is formed in the rearwardly directed face of the range piston 90 supporting the free end of the front annulus gear extension 86 therein.

The front annulus gear outer clutch drum portion 86 has external splines 102 formed thereon which are splined to a set of inner clutch discs 104 interleaved with a set of outer companion clutch discs 106 of the low-range clutch pack 88. It will be seen that the outer clutch discs 106 are splined to inner splines 108 formed integral with the inner surface of the outer housing 14. The low-range clutch pack 88 has the outer periphery of a backing plate 110 splined to the outer housing splines 108 against which the inner discs 104 and the outer discs 106 are drivingly compressed by piston 90 as it is stroked rearwardly upon its pressure chamber 96 being pressurized.

A front clutch hub element 112 is shown concentrically disposed about the central axis 22 having a central internally splined bore 114 slidably engaging external splines 116 formed on the front quill sleeve 26. The front clutch hub element 112 includes a concentrically disposed cylindrical hub portion 118 radially spaced intermediate the common carrier inner drum portion 78 and the front quill sleeve 26. The front clutch hub cylindrical portion 118 and the front carrier ring inner drum portion 78 support therebetween high range clutch means generally indicated at 120. The front retainer portion 118 has external splines 122 formed thereon splined to a set of inner discs 124 interleaved with a set of outer companion discs 126 of the high-range clutch means or pack 120. It will be seen that the outer discs 126 are splined to inner splines 130 formed integral with the inner surface of the front carrier ring extension 78. A front clutch reaction pressure or backing plate 132 for the high-range clutch pack 120 axially retained by a split ring 133 and split ring keeper 135 has a central internally splined opening 134 splined to the front quill sleeve external splines 116.

An annular select spacer ring 136 and its needle bearing assembly 138 are provided on the rearward facing surface of the range piston 90 adapted to move the front clutch hub element 112 rearwardly against the axial force of resilient biasing means in the form of a plurality of stacked front belleville return spring washers 140. It will be noted that the stack of belleville spring washers 140 encircle the front quill sleeve 26 for pre-loading high-range clutch pack 120 by virtue of being trapped between the front clutch hub element 112 and the front sun gear 38. The spring washers 140 normally bias the high-range clutch pack 120 front hub backing radial pressure flange portion 142 forwardly toward reaction pressure plate 132. Thus, the front set of belleville washers 140 normally bias the high-range clutch pack 120 into its clutch apply mode. It will be noted that the front pressure plate 132 has a window 144 formed therein allowing the front clutch hub portion 118 to extend therethrough for engagement by range piston annular spacer ring 136 enabling front piston 90, when pressurized, to release the clutch pack 120.

A rear annulus gear 150 is shown concentrically disposed about the central axis 22 with its internal teeth in meshed engagement with the teeth of each rear set pinion gear 82. The rear annulus gear 150 includes a cylindrical rearward annulus extension 152 concentrically surrounding the rear carrier ring rearward extension 80 supports with a piston outer shell-like cylindrical drum partition member 154 a two-wheel/four-wheel mode clutch means, which in the preferred form is a wet clutch pack, generally indicated at 156.

An axially movable annular mode piston 158 is slidably received in the outer shell partition member 154 and defining with the mode piston 158 a four-wheel drive mode hydraulic pressure chamber 160. The mode hydraulic pressure chamber 160 is sealed to the outer partition member 154 by mode piston outer annular seal 162 and sealed to an annular forwardly extending collar portion 164 of a sprocket gear 166 by an inner annular seal 167. It will be noted that the sprocket gear 166 is concentrically journally supported such as by roller bearings 168, on a hydraulic fluid distributor stator member 170.

The distributor hub 170 is fixedly connected to the housing rear half-section 16 such that the sprocket gear 166 and its attached outer shell-like partition member 154 rotate about the central axis 22 relative to the distributor hub 170. Spring biasing means are provided in the from of an annular spring steel return spring 172 having its inner periphery retained in an annular groove of the collar portion 164. The return spring 172 biases the mode piston rearwardly to normally disengage the mode clutch means 156.

The rear annulus gear rearward extension 152 is formed with external splines 174 splined to a set of inner annular discs 176 interleaved with a set of companion outer annular discs 178 of the clutch pack 156. The outer discs 178 are splined to inner splines 180 formed on annular clutch extension 182 suitably affixed, as by welding, to the open end of the outer partition member 154.

A rear clutch hub element 190 is shown concentrically disposed about the central axis 22 and formed with a central internally splined bore 192 slidably engaging external splines 194 formed on the rear quill sleeve 52. The rear clutch hub element 190 includes a concentrically disposed cylindrical portion 196 radially spaced intermediate the common carrier rearward extension 80 and the rear quill sleeve 52. The rear retainer element cylindrical portion 196 and the rear carrier ring extension 152 support therebetween rear modulating clutch means in the from of a wet interaxle differential lock-up clutch pack generally indicated at 198. The rear retainer portion 196 has external splines 200 formed thereon splined to a set of inner clutch discs 202 interleaved with a set of outer companion clutch discs 204. It will be seen that the outer clutch discs 204 are splined to inner splines 206 formed integral with the inner surface of the rear carrier ring extension 80. The lock-up clutch pack 198 has a rear backing plate 208 axially retained against rearward movement, formed with a central internally splined opening 210 splined to the rear quill sleeve external splines 194.

A differential clutch control locking piston 212 is slidably received for axial movement in an inner shell-like partition member 214 which defines, with the differential control piston 212, a hydraulic pressure chamber 216. The differential control hydraulic pressure chamber 216 is sealed to the inner shell-like cylindrical drum partition member 214 by locking piston outer annular seal 218 and sealed to an annular spacer member 220 by an inner annular seal 222. Resilient biasing means in the form of a plurality of stacked rear belleville return spring washers 224 encircle the rear quill sleeve 52 pre-loading the modulating clutch pack 198 by virtue of being trapped or captured between the rear clutch hub 15 element 190 and the rear sun gear 54. The rear spring washers 224 normally bias the clutch pack 198 rear hub backing radial flange portion 226 rearwardly toward reaction pressure backing plate 208. The spring washers 224 bias the inner clutch discs 202 and the outer clutch discs 204 into non-slip positive lock-up engagement whereby the carrier assembly 46 is locked to rotate in unison with the rear sun gear 54. Thus, the rear set of belleville spring washers 224 normally bias the modulating clutch pack into its fail safe applied mode obviating any inter-axle differentiation by the rear planetary gear set 50.

Thus, by varying the hydraulic force introduced into the pressure chamber 216 controlled limited slippage between the clutch discs 202 and 204 is attained whereby drive torque delivery to the first output shaft 20 may be automatically controlled. It will be noted that the rear backing plate 208 has a window 228 formed therein allowing the rear retainer cylinder portion 196 to extend therethrough for engagement by the differential control piston 212.

A chain 230 driven by the sprocket gear 166, in turn, rotates a driven sprocket gear 232 shown in FIG. 1. Sprocket gear 232, in turn, drives a second output in the form of a second output shaft 234 having a yoke coupling 236 adapted for connection to a front propeller shaft 274 (FIG. 5) suitably connected to the a vehicle front axle via differential 276.

Figure 5:
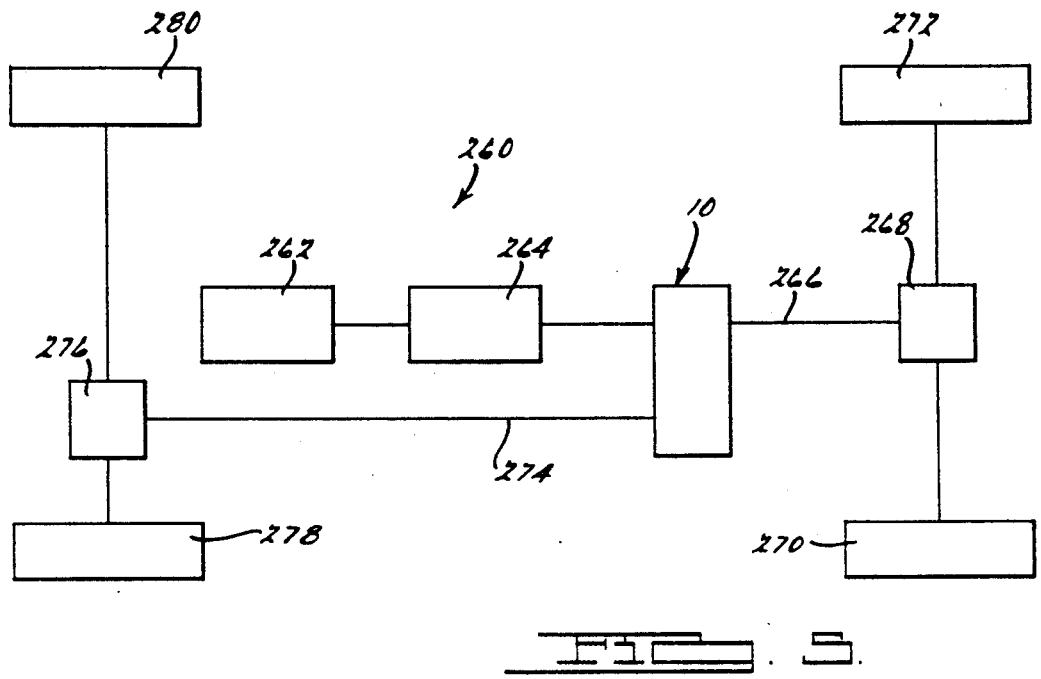
FIG. 5 is diagrammatic representation of an illustrative embodiment of a front-wheel drive motor vehicle in according with the invention.

The transfer mechanism of the present invention is adapted for use with a drive train arrangement 260, shown schematically in FIG. 5, comprising an engine 262 coupled through a transmission 264 to the transfer mechanism 10. The transfer mechanism 10 includes a rearwardly extending rear propshaft or drive line output 266, suitably connected to the first or central output shaft 20, which is connected with a rear axle drive 268 for driving, via split rear axle parts, rear wheels 270 and 272. In addition, the transfer mechanism 10 includes a forwardly extent front propshaft or drive line 274, suitably connected as by coupling 236 to the second or offset output shaft 234, which is coupled to a front axle drive mechanism 276 for driving, via split front axle parts, front wheels 278 and 280. Preferably, each of the axle drives 268 and 276 include an interwheel differential mechanism for applying torque to the left and right wheels of the associated axle set as required.

Figure 4:
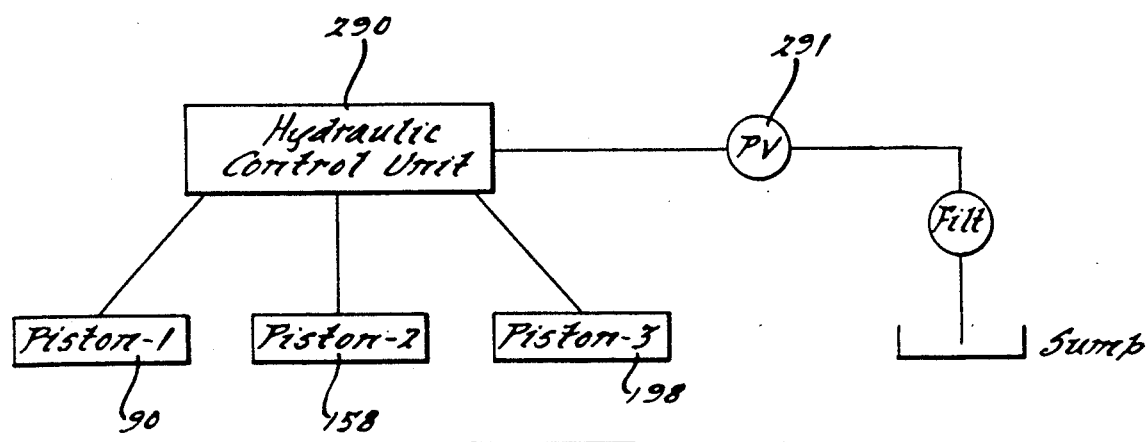
FIG. 4 is a schematic block diagram showing a hydraulic control system for use with the present invention of FIG. 1.

As seen in FIG. 4, a suitable hydraulic control unit 290 such as a microcomputer processor, is provided for the system to control hydraulic pressure to each of the three pistons 90, 158, and 198, via a variable drive pump 291. An instrument panel mounted electrical control means, such as switch 292, is connected by lead wire 293 to the control unit 290. The switch 292 has a slidable indicator 294 enabling the operator to manually select the drive mode of the vehicle. The control unit 290 controls, via a suitable hydraulic line 295, the flow of the hydraulic fluid to distributor hub 170 for distribution to the hydraulic pressure chambers 96, 160 and 216. The control switch indicator 294 is shown having four preset switching position or operating states, namely 2WDH, 4WDH, 4WDL and 4WDLL.

Further, the system allows the operator to move the indicator 294 to an infinite number of settings between 4WDL and 4WDLL. With reference to the graph of FIG. 6, it will be seen that in the 4WDL setting the clutch pack 198 is totally released providing a full-time four-wheel drive low setting wherein forty percent of the drive torque is transmitted to the rear axle and sixty percent of the drive torque is transmitted to the front axle. In the 4WDLL setting the clutch pack 198 is totally applied providing a part-time four-wheel drive low lock setting wherein one hundred percent of the torque is applied to the rear axle and dependent on variable ground load conditions such as the coefficient of friction at each wheel, tire inflation pressures, etc.

Figure 6:
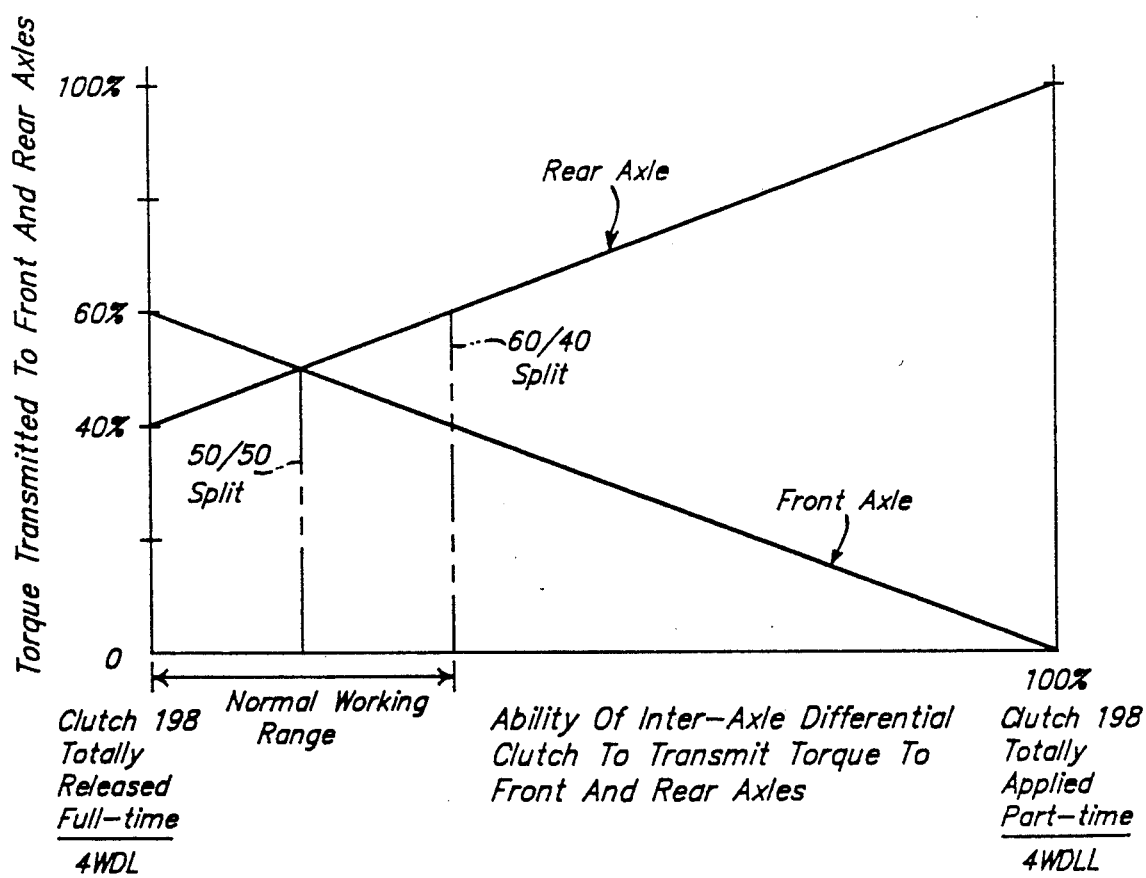
FIG. 6 is a graph showing control characteristics of the full time power transfer case of the invention.

A "normal working range" for 4WDL is shown on the FIG. 6 graph wherein the system splits the torque at about a 60/40 ratio. That is, a minimum of forty percent torque is delivered to the rear axle with the clutch pack 198 totally released. The drive torque above forty percent may be transmitted directly to the rear axle by "feathering", i.e., partially engaging the modulating clutch pack 198. In this way the normal working range may be varied to provide an intermediate 50/50 torque split while with increased pressure applied to the clutch pack 198, a 60/40 torque split is attained with sixty percent torque being delivered to the rear axle and forty percent torque being delivered to the front axle. The feathering action of the clutch pack 198 thus provides limited slip differential action which may be controlled automatically or manually by the indicator 294.

With reference to the control switch indicator 294 in its full line 2WDH position of FIG. 2, it will be seen that in the two-wheel drive high-range shift position none of the three pistons 90, 158, or 212 are pressurized, i.e. each of the three pistons are spring loaded so as to be resiliently biased to their respective fail-safe positions. As a consequence the high-range clutch pack 120 and the modulating lock-up clutch pack 198 are applied while the low-range clutch pack 88 and the mode clutch pack 156 are not applied. Thus, the torque flow path is from the transmission output shaft 24 to the front quill sleeve 26, the front clutch hub element 112, the high-range clutch pack 120, the common carrier forward extension 78, the pins 44, the rear annulus gear portion 152 and the differential lock-up clutch pack 198.

With the indicator 294 moved to its second 4WDH setting, i.e. full time four-wheel drive high-range shift position, the differential planetary locking piston 212 is pressurized causing the clutch pack 198 to be released, while at the same time the mode piston 158 is pressurized causing the mode clutch pack 156 to be applied. Thus, the torque flow path is now from the transmission output shaft 24 to the front quill sleeve 26, the front clutch hub element 112, the clutch pack 120 together with the common carrier forward extension 78, the pins 44, and the rear set of pinion gears 82 whereupon a torque split provides dual flow torque paths. The first split torque path involves the rear annulus gear 150, the mode clutch pack 156, the outer shell member 154, the sprocket gear 166, and thence to the second output shaft 234 via the chain 230. The second split torque path involves the rear sun gear 54, the rear quill sleeve 52, and thence to the to the first output in the form of central first output shaft 20 for transmission to a rear propeller shaft 266 (FIG. 5) suitably connected to a vehicle rear axle and rear wheels 272 via a rear differential 268.

With the indicator 294 moved to its third 4WDL setting, i.e. four-wheel drive low-range "no spin" shift position, the front range piston 90 is pressurized releasing the spring bias on the high-range clutch pack 120 and applying the low-range clutch pack 88. At the same time the mode piston 158 remains pressurized while the differential piston 212 is not pressurized returning the lock-up clutch pack 198 to its spring biased applied state. The torque flow path is now from the transmission output shaft 24 to the front quill sleeve 26, the front planetary gear set sun gear 38, the front set of pinion gears 42, the pins 44, and the rear planetary gear set pinion gears 82, whereupon a torque split provides dual torque flow paths. One split torque path involves the rear annulus gear 150, the applied mode clutch pack 156, the outer shell member 154, the sprocket gear 166, and thence to the second output shaft 234 via the chain 230. The other split torque path involves the common carrier rear ring rearward extension the applied differential clutch pack 198, the rear hub element 190, the rear quill sleeve 52, and the first output shaft 20.

With the indicator 294 moved to its fourth 4WDLL setting, i.e. four-wheel part time drive low-range shift position the front range piston 90 and the mode piston 158 are pressurized while the differential piston 212 may have variable pressure applied thereto. With pressure applied to the lock-up clutch pack 198 a full time four-wheel high drive range is provided wherein about sixty percent of the drive torque is applied to the front axle and a minimum of about forty percent of the drive torque is applied to the rear axle by the inter-axle planetary differential 50. Upon the modulating lock-up clutch pack 198 being initially depressurized, i.e., the clutch pack 198 being partially engaged or "feathered", the drive torque applied to the front axle may decrease from sixty percent to zero percent while the drive torque applied to the rear axle may increase from forty percent to 100 percent.

In operation the front planetary gear set 40, with either the low-range clutch pack 88 or the high-range clutch pack 120 applied, delivers two speeds through the common carrier assembly 46 to the aft planetary gear set 50. With the mode clutch pack 156 applied, the aft differential planetary gear set 50 splits or divides power between the front and rear axles in a ratio of about sixty/forty as shown in the FIG. 6 graph. That is, about sixty percent of the engine's drive torque is delivered to the second output shaft 234, via a chain 230 driven by the sprocket gear 166, and about forty percent of the engine's drive torque to the front axle via the first output shaft 20. A minimum of forty percent of the engine's drive torque is delivered to the first output shaft 20 via the aft sun gear 54. The drive torque above forty percent may be selectively transmitted to the rear output shaft 20 and thence to the rear axle by decreasing the hydraulic force in pressure chamber 216 a predetermined amount such that the discs 202 and 204 of the differential clutch pack 198 slip or feathered in a determined manner.

Thus, one hundred percent of the drive torque may be transmitted to the rear drive shaft 20 if the clutch pack 198 is fully engaged as seen in the graph of FIG. 6.

With one hundred percent of the drive torque being transmitted to the central drive shaft 20 and the rear axle the mode clutch pack 156 may be unlocked by decreasing the hydraulic force in pressure chamber 160. This allows the chain 230 and thus the second output drive shaft 234 to be unloaded providing rear wheel or two wheel drive mode. It will be appreciated that varying the hydraulic force in the pressure chamber 216 results in limited slip differential action of the aft planetary differential gear set 50.

While a specific embodiment of the invention has been shown and described in detail to illustrate the application of the principles of the invention, it will be understood that the invention may be embodied in other forms without departing form such principles.

What is claimed is:

1. A transfer case for coupling the output of a vehicle transmission to at least two axle drive mechanisms of the vehicle, said transfer case comprising an outer housing, an input means for receiving the torque output from the vehicle transmission, a first output shaft and first means for rotatably supporting said first output shaft in said outer housing, a second output shaft and second means for rotatably supporting said second output in said outer housing; an improved mechanism, including hydraulic control means, for selectively driving said first and second output shafts in response to activation of said input means, comprising:

a front high-low range planetary gear set having a front sun gear driven by said input means journalled on said first output shaft, a front annulus gear supported for rotation about said front sun gear by a plurality of front planetary gears in constant mesh with both said front annulus gear and said front sun gear;

carrier means operatively supporting said front planetary gears;

after torque transfer means operative to receive the output torque from said carrier means for supplying drive torque to said first and second output shafts;

high-range clutch means being normally applied by front spring biasing means which when engaged locks both said carrier means and said front annulus gear for rotation with said front sun gear, whereby high-range drive torque is transferred from said input means to said high-range clutch means, said carrier means and thence to said aft torque transfer means for selective driving by said control means said first and second output shafts;

hydraulically operated first piston means adapted upon pressurization to release said high-range clutch means enabling said carrier means to rotate relative to said front sun gear; and whereby said first piston means further operative upon pressurization to release said high-range clutch means and apply low-range clutch means, said low-range clutch means operative when applied to lock said front annulus gear to said outer housing such that low-range drive torque is transferred from said input means to said front sun gear, said front planetary gears, said carrier means and thence to said aft torque transfer means for selective driving by said control means of said first and second output shafts.

2. The transfer case as set forth in claim 1, wherein: said aft torque transfer means in the form of an aft planetary gear set adapted to provide an inter-axle differential between the two axles, said aft planetary gear set having an aft sun gear in concentric engagement with said first output shaft, an aft annulus gear supported for rotation about said aft sun gear, a plurality of aft planetary gears supported by said carrier means with said aft planetary gears in constant mesh with said aft annulus gear and said aft sun gear;

four-wheel drive mode clutch means being normally released by mode clutch spring biasing means, said mode clutch means being applied by means of the pressurization of a hydraulically operated second piston so as to drivingly connect said aft annulus gear to said second output shaft;

inter-axle differential clutch means being normally applied by aft spring biasing means operative to lock said carrier means for rotation with said aft sun gear, said inter-axle differential clutch means being released by means of the pressurization of a hydraulically operated third piston enabling said carrier means to rotate relative to said aft sun gear, such that said aft planetary gear set adapted to provide an inter-axle differential between two of the axle drive mechanisms.

3. The transfer mechanism as set forth in claim 2, whereby:

upon said four-wheel drive mode clutch being released and hydraulic pressure being decreased a predetermined amount to said third piston enabling said aft spring biasing means to apply said inter-axle differential clutch means such that output torque from the transmission being transmitted via said front planetary gear set through said carrier means to said aft sun gear and thence to said first output shaft; and whereby upon said four-wheel drive mode clutch means being applied and with the hydraulic pressure being selectively increased to said third piston enabling controlled modulation of said inter-axle differential clutch means such that the transmission output torque is split, wherein a predetermined portion of the transmission output torque is transmitted to said first drive shaft via said aft sun gear, and wherein the remaining portion of the transmission output torque is transmitted to said second drive shaft via said aft annulus gear.

4. A transfer case for coupling the output of a vehicle transmission to at least two axle drive mechanisms of a vehicle, said transfer case comprising an outer housing, an input means for receiving the torque output from the vehicle transmission, a first output shaft and first means supporting said first output shaft in said outer housing for rotation about a central axis, a second output shaft and second means rotatably supporting said second output shaft in said outer housing, an improved mechanism for selectively driving said first and second output shafts upon activation of said input means by control means comprising:

a front quill sleeve surrounding a portion of said input shaft and fixed thereto, said front quill sleeve journally supported about said first output shaft for relative rotation therewith about said central axis;

a front sun gear of a high-low range planetary gear set fixed to said front quill sleeve for rotating therewith;

a carrier assembly journally supported on said first output shaft rearwardly of said front quill sleeve, said carrier assembly supporting a plurality of longitudinally extending pins concentrically arranged about said central axis, each said pin journally supporting adjacent its front end one of a plurality of front planetary gears with each said front planetary gear in meshing engagement with both said front sun gear and an outer front annulus gear concentrically disposed about said front sun gear central axis;

said carrier assembly including a forwardly extending cylindrical portion in the form of a front carrier clutch drum concentrically disposed about said central axis, and said front annulus gear including a forwardly extending cylindrical portion in the form of a front annulus clutch drum concentrically surrounding said front carrier clutch drum, a low-range clutch pack supported radially intermediate said front annulus clutch drum and said outer housing;

torque transfer means disposed rearwardly of said quill sleeve operative by said control means to receive the output torque from said carrier assembly for supplying drive torque to said first and second output shafts;

a front clutch hub element concentrically supported on said front quill sleeve for axially slidable movement relative thereto, about said central axis comprising an annular stem portion formed with a central internally splined bore slidably engaging external splines on said front quill sleeve;

a high-range clutch pack supported radially intermediate said front hub element and said front carrier clutch drum;

axially acting compression front spring means disposed intermediate said front sun gear and said front clutch hub element, said front spring means acting to normally bias said front hub element forwardly engaging said high-range clutch pack;

an annular range piston concentrically disposed about said central axis and defining with a portion of said outer housing a front hydraulic pressure chamber, said range piston adapted for axial movement whereby upon said front chamber being pressurized said range piston is stroked rearwardly thereby causing rearward movement of said front clutch hub element compressing said front spring means and releasing said high-range clutch pack, and whereby said range piston adapted, upon further rearward movement, said range piston applying said low-range clutch pack wherein said front annulus is locked to said outer housing such that drive torque is supplied to said first and second output shafts;

said high-range clutch pack being normally applied by said front spring biasing means to lock said carrier assembly for rotation with said front sun gear, whereby high-range drive torque from said input shaft is transferred, via said front hub element, said high-range clutch pack, and said carrier assembly to said torque transfer means supplying drive torque to said first and second output shafts; and said high-range clutch pack being released by the pressurization of said front chamber causing said range piston to be stroked rearwardly and compressing said front spring means thereby moving said front clutch hub element rearwardly releasing said high-range clutch pack, said range piston operative, upon release of said high-range clutch pack, to apply said low-range clutch pack thereby locking said front annulus gear to said outer housing, whereby low-range drive torque is transferred via said front sun gear, said plurality of front planetary gears, said carrier assembly, and said aft torque transfer means for selective driving of said first and second output shafts.

5. The transfer mechanism as set forth in claim 4, wherein:

said aft torque transfer means in the form of an aft planetary gear set adapted to provide an inter-axle differential between said two axles drive mechanisms, said aft planetary gear set having an aft sun gear in concentric engagement with said first output shaft, an aft annulus gear supported for rotation about said aft sun gear by a plurality of aft planetary gears in constant mesh with said aft annulus gear and said aft sun gear;

said carrier assembly operatively supporting said aft planetary gear set;

an inter-axle differential modulating clutch pack being normally applied by aft spring biasing means locking said carrier assembly for rotation with said aft sun gear, said differential control clutch pack being released by means of the pressurization of a hydraulically operated second piston enabling said carrier assembly to rotate relative to said aft sun gear;

a four-wheel drive mode clutch pack being normally released by mode spring biasing means, said mode clutch pack being applied by means of the pressurization of a hydraulically operated third piston thereby coupling said aft annulus gear to said second output shaft for supplying drive torque to both said first and second output shafts.

6. The transfer mechanism as set forth in claim 5, whereby:

upon said aft spring biasing means applying said inter-axle differential modulating clutch pack drive torque being transmitted, via said front planetary gear set through said carrier assembly to said aft sun gear and thence to said first output shaft; and whereby upon said four-wheel drive mode clutch pack being applied and with hydraulic pressure being selectively increased to said second piston providing controlled slippage of said modulating clutch pack such that the drive torque output from the vehicle transmission is split, wherein a predetermined portion of the drive torque output is transmitted to said first drive shaft via said aft sun gear, and the remaining portion of the output drive torque is transmitted to said second drive shaft.

7. A vehicle transfer mechanism for a four-wheel drive vehicle having an input adapted to be rotatable driven about a central axis by an engine and also having first and second outputs that rotatably drive first and second output shafts, respectively, the transfer case comprising:

an outer housing;

a central shaft rotatably supported by said housing along the central axis, said central shaft having a front end and an aft end, said front end thereof being disposed adjacent the aft end of said input shaft and said aft end thereof constituting the first output of the transfer case;

a front quill sleeve concentrically surrounding the aft end of said input shaft and fixed thereto, said front quill sleeve journally supported about surrounding the forward end of said central shaft for relative rotation therewith; a first sun gear of a front high-low range planetary gear set fixed to the aft end of said front quill sleeve to rotate therewith;

an aft quill sleeve concentrically surrounding said central shaft and fixed thereto for rotation therewith, a second sun gear of a rear differential planetary gear set fixed to the forward end of said aft quill sleeve adjacent said first sun gear;

a common carrier assembly having mounting means interposed between said front and rear planetary gear sets, said carrier assembly supporting a plurality of longitudinally extending pins concentrically arranged about the central axis, each said pin journally supporting adjacent its front end one of a first set of planetary gears of said front planetary gear set, said carrier assembly having forward and rearward extending cylindrical carrier extensions concentrically disposed about said central axis;

a front annulus gear concentrically arranged about said central axis having internal teeth meshing with said front set of planetary gears, said front annulus gear having an integrally forwardly extending cylindrical outer clutch drum concentrically surrounding an inner clutch drum of said carrier assembly and supporting with said outer housing a low-range clutch pack;

a front retainer element is concentrically disposed about the central axis and comprises a central bore having internal splines slidably engaging external splines on said front quill sleeve, said front retainer element further comprises a cylindrical portion radially spaced intermediate said carrier forward extension and said front quill sleeve supporting with said carrier forward extension a high-range clutch pack, and front spring means disposed intermediate said forward sun gear and said front retainer operative to normally bias said front retainer forwardly disengaging said high-range clutch pack;

a range piston concentrically disposed about said central axis and defining with said housing a front hydraulic pressure chamber, said range piston adapted for axially slidable rearward movement whereby upon said front chamber being pressurized said range piston is stroked rearwardly compressing said front spring means thereby disengaging said high-range clutch pack and engaging said low-range clutch pack;

a rear retainer element is concentric about said central axis and comprises a central bore having internal splines slidably engaging external splines on said rear quill sleeve, said rear retainer element further comprising a cylindrical portion radially spaced intermediate said carrier rearward extension and said rear quill sleeve and supporting with said carrier rearward extension a differential lock-up clutch pack, and rear return spring means disposed intermediate said rear sun gear and said rear retainer operative to normally bias said rear retainer rearwardly engaging said differential lock-up clutch pack;

a differential piston concentrically disposed about said central axis and defining with a rear inner cylindrical shell member fixed on said rear quill sleeve a differential hydraulic pressure chamber, said differential piston adapted for axially slidable forward movement whereby upon said differential pressure chamber being pressurized said differential piston is stroked forwardly in opposition to said rear return spring means thereby disengaging said differential lock-up clutch pack and allowing said common carrier assembly to revolve about said central axis relative to said rear sun gear, such that said rear planet gear set provides an inter-axle differential between said first and second output shafts, to revolve about said central axis;

said rear annulus gear having a rearward annulus extension disposed intermediate said carrier rearward extension and said housing and supporting therebetween a mode clutch pack;

a mode piston concentrically disposed about said rear chamber element and defining with an outer cylindrical shall member a mode hydraulic pressure chamber, said outer shell member concentrically surrounding said mode piston and said rear annulus gear extension, said outer shell member concentrically surrounding said mode piston and said rear annulus gear extension, said outer shell member affixed to a rearwardly extending second output journally supported for rotation about said central axis, means engaging said second output with said offset shaft for rotatably driving said offset shaft;

said mode piston adapted for axially slidable reciprocal movement and mode return spring means biasing said mode piston rearwardly so as to normally disengage said mode clutch pack, whereby upon said mode pressure chamber being pressurized said mode piston is stroked forwardly compressing said mode return spring means thereby engaging said mode clutch pack such that said rear annulus gear is adapted to drive said offset shaft providing a four-wheel drive mode for a vehicle.

8. The torque transfer mechanism as set forth in claim 7, wherein upon hydraulic pressure being selectively applied to said differential piston providing controlled slippage of said differential lock-up clutch pack such that drive torque output from the vehicle transmission is split, wherein a predetermined portion of the drive torque output is transmitted to said first drive shaft via said aft sun gear, and the remaining portion of the output drive torque is transmitted to said second drive shaft.

* * * * *